United States Patent [19]

Martino et al.

[11] 3,922,318

[45] Nov. 25, 1975

[54] PROCESS FOR PURIFYING BUTADIENE AND ISOPRENE BY SELECTIVE HYDROGENATION OF THE ACETYLENIC IMPURITIES CONTAINED THEREIN

[75] Inventors: Germain Martino, Poissy; Robert Stern, Marly Le Roi; Jean Cosyns, Nanterre, all of France

[73] Assignee: Institut Francais du Petrole, Rueil-Malmaison, France

[22] Filed: Mar. 12, 1974

[21] Appl. No.: 450,460

[30] Foreign Application Priority Data

Mar. 16, 1973 France .............................. 73.09656

[52] U.S. Cl. ...................... 260/681.5 R; 260/677 H
[51] Int. Cl.$^2$ ........................ C07C 5/16; C07C 7/00
[58] Field of Search ....... 260/681.5 R, 683.9, 677 H

[56] References Cited

UNITED STATES PATENTS

| | | | |
|---|---|---|---|
| 3,274,286 | 9/1966 | Reich ........................... | 260/681.5 R |
| 3,555,106 | 1/1971 | Ohmori ........................ | 260/681.5 R |
| 3,674,888 | 7/1972 | Derrien et al. ................ | 260/681.5 R |
| 3,784,481 | 1/1974 | Lassau et al. .................... | 260/683.9 |
| 3,819,739 | 6/1974 | Fahey ........................... | 260/681.5 R |

*Primary Examiner*—Paul M. Coughlan, Jr.
*Attorney, Agent, or Firm*—Millen, Raptes & White

[57] ABSTRACT

A liquid phase containing butadiene and/or isoprene and acetylenic impurities is contacted with hydrogen, in the presence of a hydrogenation catalyst containing at least one non-noble metal from any of groups IV$_A$ to VII$_A$ or VIII, the liquid phase also containing cyclopentadiene and the temperature being lower than 80°C.

17 Claims, No Drawings

PROCESS FOR PURIFYING BUTADIENE AND ISOPRENE BY SELECTIVE HYDROGENATION OF THE ACETYLENIC IMPURITIES CONTAINED THEREIN

Butadiene and isoprene, particularly when obtained by hydrocarbon pyrolysis, are known to contain acetylenic hydrocarbons which constitute quite undesirable impurities.

The commonly used processes for eliminating acetylenics from butadiene or isoprene make use of very costly extractive distillations. It has also been proposed to carry out selective hydrogenation, mainly of the $C_4$ cut, in the presence of catalysts containing noble metals, such as palladium. This technique has the inconvenience of a substantial loss of butadiene. The same inconvenience is observed when other catalysts are used, for example iron, cobalt or nickel.

We have now surprisingly found that the presence of cyclopentadiene in the feed charge results in far higher selectivities and that this effect is particularly significant with catalysts containing non-noble metals; conversely, with noble metals, the effect is insignificant.

The process of the invention consists of contacting hydrogen with a liquid phase containing impure butadiene and/or isoprene, for example a $C_4$ and/or $C_5$ cut, and cyclopentadiene in the presence of a hydrogenation catalyst at a temperature lower than 80°C, the preferred temperatures being in the range of from 10° to 50°C.

The $C_4$ and $C_5$ cuts may be obtained from any high temperature pyrolysis process yielding olefinic, diolefinic and acetylenic compounds, particularly steam-cracking which yields unsaturated compounds such as butadiene, isoprene and cyclopentadiene in large amounts, and also acetylenic compounds in minor amounts. The latter are undesirable for further petrochemical uses such, for example, as polymerization, for which their content must be lowered to a few tens of p.p.m.

The hydrogen partial pressure is usually in the range of from 0.2 to 70 bars, preferably from 0.5 to 20 bars; it must be sufficient for maintaining in liquid phase, the compounds subjected to hydrogenation.

If so desired, solvents may be used. The solvents to be used, either as diluent or as stationary phase, when operating with homogeneous catalysts or with catalysts dispersed throughout the liquid phase, are preferably hydrocarbons of more than five carbon atoms such as, for example, benzene, toluene, cetane or decahydronaphthalene.

We can hydrogenate either a $C_5$ cut alone, provided it contains cyclopentadiene or a $C_4$ cut admixed with cyclopentadiene or still, according to a preferred embodiment of the invention, we can treat a $C_4$ cut admixed with a cyclopentadiene-containing $C_5$ cut, or even directly a $C_4+C_5$ cut obtained by distillation of a pyrolysis effluent.

The amount of cyclopentadiene is usually 0.1-10 times the weight of butadiene and/or isoprene. With respect to pyrolysis $C_4$ and/or $C_5$ cuts, the proportion of cyclopentadiene in the feed charge may range from 1 to 40 % b.w. ; it is preferably higher than 5 %.

Lower cyclopentadiene contents, indeed, do not yield the desired selectivity, and higher contents have no economic advantage.

As shown hereinbefore, the reaction temperature ought to be moderate since beyond 50°C and mainly beyond 80°C cyclopentadiene tends to polymerize and deactivate the catalyst.

The catalysts which are used in this invention may be soluble or dispersed in the liquid phase or deposited on inorganic or organic carriers according to conventional techniques.

Useful metals are those of groups $IV_A$, $V_A$, $VI_A$, $VII_A$ and VIII (not-noble), preferably iron, cobalt and/or molybdenum.

These metals are preferably used in the form of carboxylates, particularly those containing 5–20 carbon atoms per carboxylate group. The preferred reducing agents have the formula $AlR_3$ in which each R group is hydrogen or an alkyl group of 1-6 carbon atoms.

The atomic ratio Al/metal is preferably 1–20.

It is not possible to determine if, in the so-obtained catalysts, the catalyst metal is in a metallic state or is a partially reduced salt or complex.

When using a supported catalyst, the content of active element, calculated as metal, for example Co, Fe or Mo, is 0.1–10 % by weight.

The catalysts may be obtained, for example, according to various techniques, as follows :

1. A catalyst which is soluble or finely dispersed in the hydrocarbons may be obtained by reacting a transition metal salt with a metal hydride or an organometallic reducing agent such as an organomagnesium compound, an organolithium compound, an organosodium compound or an organoaluminum compound.

2. The catalysts obtained according to the technique No. 1 may be deposited on organic or inorganic carriers, such as silica or alumina.

3. The catalyst may also be obtained by impregnation of a carrier with a solution of an organic salt of a transition metal in a hydrocarbon, followed with a drying and a reducing step, either by means of hydrogen or with organometallic reducing agents or hydrides.

4. Another technique consists of impregnating a carrier by means of an aqueous solution of a transition metal salt, drying and/or calcining, and reducing either with hydrogen or with an organometallic reducing agent or hydride.

The above methods are given for illustrative, not limitative purposes.

The techniques of operation are adapted to the various catalysts which may be used according to the invention.

1. With respect to soluble catalysts, we prefer using a heavy solvent, such as hereinbefore defined, as the stationary phase, and discharge the products in the vapor phase.

2. With respect to solid catalysts, we prefer using a tubular reactor. We can prepare the supported catalyst by passing a homogeneous solution of catalyst through the previously arranged carrier.

The reductions with hydrogen, organometallic reducing agents or hydrides are carried out in the plant.

The molar ratio of hydrogen to the acetylenics may range from 1 to 1,000, preferably from 2 to 50.

The throughput rates are adapted to the desired performances.

Irrespective of the embodiment, we obtain an outflow which usually contains less than 100 ppm of acetylenics, the diolefin loss being insignificant.

The following non-limitative examples illustrate the invention.

EXAMPLE 1

This example is given for comparison purpose.

50 cc of a benzenic solution containing 10 % by volume of isoprene and 1% of 2-butyne is charged into a 100 cc reactor. The temperature is maintained at 20°C and 5 cc of a catalytic solution obtained by reacting 0.35 mmole of iron stearate with 1.4 mmole of triethylaluminum in benzene is added thereto. The hydrogen pressure is raised to 2 bars and stirring is started.

After 20 minutes, 1 cc of liquid material is withdrawn and analyzed. 95% of 2-butyne has disappeared and the ratio of the methyl butenes to the butenes, which gives the isoprene consumption, is 2.05. After 30 minutes, all the butyne has been consumed and the ratio of the methyl butenes to the butenes is 2.3.

EXAMPLE 2

Example 1 is repeated, except that 5 cc of benzene are replaced by 5 cc of cyclopentadiene. The analysis of the effluent after a 5 hours reaction shows that butyne has been consumed and the ratio $$\frac{\text{methyl butenes}}{\text{butenes}}$$

is 0.18. Cyclopentadiene has remained unconverted.

EXAMPLES 3 – 8

Example 2 is repeated, except that the nature of the transition metal has been changed.

| Example | Metal | Time (mn) | Conversion of 2-butyne | Methyl butenes / butenes |
|---------|-------|-----------|------------------------|--------------------------|
| 3 | Ni[1] | 4 | 95 | 2.5 |
| 4 | Co[1] | 10 | 98 | 1 |
| 5 | Pd[2] | 5 | 90 | 10 |
| 6 | Mo[1] | 300 | >99 | 0.47 |
| 7 | Mn[3] | 200 | 25 | 0.25 |
| 8 | Cr[1] | 300 | 31 | 0.23 |

[1] stearate;
[2] acetylacetonate;
[3] octanoate

In examples 4, 6, 7 and 8, cyclopentadiene has been hydrogenated in very low proportion, while, in example 3 and, above all, in example 5, cyclopentadiene has been hydrogenated in major proportion.

Example 5 shows that the selectivity is particularly poor when using palladium.

EXAMPLE 9

Example 2 is repeated at a hydrogen pressure of 10 bars. After 1 hour, the reaction is stopped and analysis is carried out. The 2-butyne conversion is higher than 99% and the ratio methylbutenes/butenes is 0.23.

EXAMPLE 10

A tubular reactor is fed under argon with 5g of catalyst obtained by impregnating 5g of silica with a benzenic solution of the reaction product of 0.35 mmole of iron stearate with 1.4 mmole of triethylaluminum followed with drying under vacuum. We have then passed over this catalyst 50 cc/hour of a solution containing 10% by volume of isoprene, 10% by volume of cyclopentadiene and 10% by volume of 2-butyne in benzene, and 1 liter/hour of hydrogen under a total pressure of 10 bars and at a temperature of 20°C. The analysis of the effluent shows a 2-butyne conversion of 95% and a ratio $$\frac{\text{methylbutenes}}{\text{butenes}}$$

of 0.2.

EXAMPLE 11

Example 10 is repeated with 5g of a catalyst containing 2% of iron, as obtained by impregnating silica with iron nitrate in aqueous medium, calcining and reducing under hydrogen stream at 400°C. The analysis of the effluent shows that the conversion of 2-butyne is smaller (70%) although the selectivity expressed as $$\frac{\text{methylbutenes}}{\text{butenes}}$$

is 0.2.

EXAMPLE 12

50 cc of a steam-cracking $C_5$ cut containing by volume 25 % of isoprene, 30 % of cyclopentadiene and 0.5 % of acetylenics, the remainder being formed of saturated and olefinic hydrocarbons, together with other diolefins, is charged into a 100 cc reactor. We add 5 cc of a solution in decahydronaphthalene of product resulting from the reaction of 1 mmole of iron stearate with 3.5 mmoles of triisobutylaluminum. The temperature is 20°C and after having raised the pressure to 10 bars, stirring is started. It is stopped after 2 hours and the liquid phase is analyzed. The total amount of residual acetylenics is lower than 100 ppm; cyclopentadiene has remained unconverted and the remaining isoprene amounts to 24.5 % of the effluent.

EXAMPLE 13

The same catalyst has been used for comparison purpose, under the same conditions, for hydrogenating a steam-cracking $C_4$ cut containing butane, butenes, 35% by volume of butadiene and 0.7% of various acetylenics. After 0.1 hour reaction, the analysis gives 200 ppm of residual acetylenics and 30.2 % of butadiene. This shows that, when working without cyclopentadiene, the selectivity is poor.

EXAMPLE 14

The above $C_4$ and $C_5$ cuts are admixed together so that the resulting mixture contains 15% of cyclopentadiene, 0.6% of acetylenics, 12.5% of isoprene and 17.5% of butadiene. The operation is carried out in the conditions of example 12; after 1 hour of reaction, the analysis results are :

| | |
|---|---|
| acetylenics | < 100 ppm |
| cyclopentadiene | 15 % |
| isoprene | 12.35 % |
| butadiene | 17.05 % |

What we claim is:

1. In a process for selectively hydrogenating acetylenic hydrocarbon impurities contained in a diolefin selected from the group consisting of butadiene, isoprene and mixtures thereof, wherein said diolefin in liquid phase is reacted with hydrogen at a temperature lower than 80° C in the presence of a hydrogenation catalyst containing at least one metal selected from the group consisting of iron, molybdenum and cobalt, the improvement comprising conducting said hydrogenating in the additional presence of cyclopentadiene in an amount of 0.1 to 10 times by weight the amount of said diolefin.

2. A process according to claim 1, wherein the temperature is 10°–50°C and the hydrogen pressure 0.2–70 bars.

3. A process according to claim 1, wherein the hydrogenation catalyst is the product obtained by reacting an iron, molybdenum or cobalt compound with a metal hydride or an organo metal compound.

4. A process according to claim 1, wherein the catalyst contains iron.

5. A process according to claim 4, wherein the catalyst is a reaction mixture of an iron salt and triethylaluminum.

6. A process according to claim 1, wherein the catalyst contains molybdenum.

7. A process according to claim 6 wherein the catalyst is a reaction mixture of a molybdenum salt and triethylaluminum.

8. A process according to any of claim 1, wherein the catalyst contains cobalt.

9. A process according to claim 1, wherein the liquid phase is a $C_5$ pyrolysis cut.

10. A process according to claim 1, wherein the liquid phase is a mixture of $C_4$ and $C_5$ pyrolysis cuts.

11. A process according to claim 1, wherein the amount of cyclopentadiene in the liquid phase is 1-40 % by weight.

12. A process according to claim 1 wherein the amount of cyclopentadiene in the liquid phase is 5-40 % by weight.

13. A process according to claim 1, wherein the catalyst is soluble in the liquid phase.

14. A process according to claim 1, wherein the catalyst is in the solid state and arranged in fixed bed.

15. A process according to claim 1, wherein the molar ratio of hydrogen to the acetylenic hydrocarbons is 1 : 1 to 1,000 : 1.

16. A process according to claim 1, wherein over 90% of the acetylenic impurities are hydrogenated together with an insignificant amount of the diolefin.

17. A process according to claim 16, wherein resultant hydrogenated liquid contains less than 100 p.p.m. of said acetylenic impurities.

* * * * *